Figure 9:
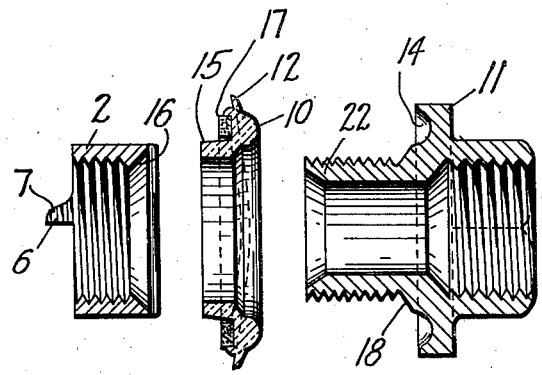

Dec. 9, 1930.                P. J. LINDGREN                1,784,637
                              PIPE CONNECTION
                         Filed April 28, 1927        2 Sheets-Sheet 1
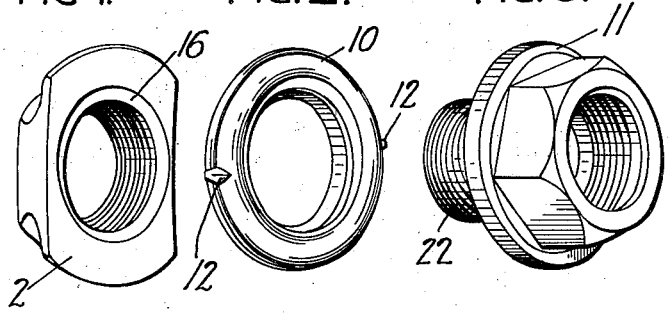
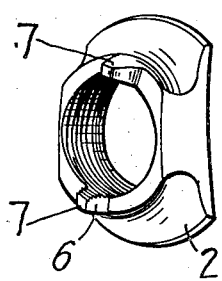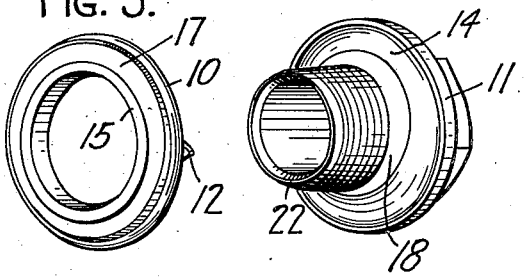
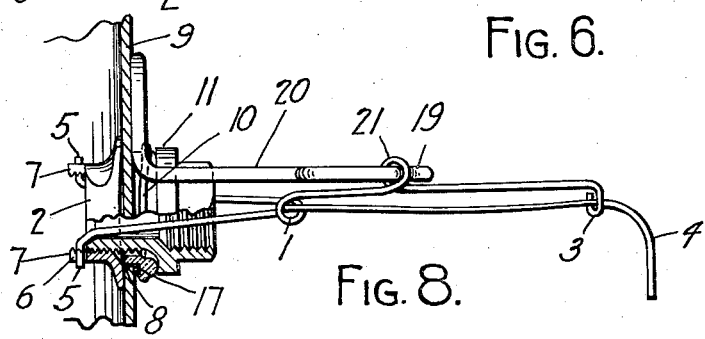
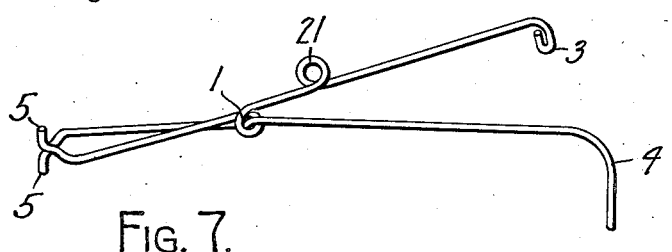
INVENTOR
PETER J. LINDGREN
BY
Rolland S. Trott
ATTORNEY Dec. 9, 1930.                    P. J. LINDGREN                    1,784,637
                                 PIPE CONNECTION
                              Filed April 28, 1927         2 Sheets-Sheet 2

INVENTOR
PETER J. LINDGREN
BY
Rolland S. Trott
ATTORNEY

Patented Dec. 9, 1930

1,784,637

UNITED STATES PATENT OFFICE

PETER J. LINDGREN, OF DENVER, COLORADO, ASSIGNOR TO JOHN W. HORNER, OF DENVER, COLORADO

PIPE CONNECTION

Application filed April 28, 1927. Serial No. 187,390.

My invention relates to pipe couplings for connecting circulating water heaters to range boilers or tanks, or for connecting the hot coil of a stove or furnace to a range boiler or tank.

The object of my invention is to provide such a coupling which may be installed in a boiler or tank as an accessory after it is manufactured, and which will, as an accessory, give the same satisfactory service as a standard built-in coupling.

Many attempts have been made to solve the problems of a commercial accessory boiler or tank coupling, but none of them to date has been perfectly satisfactory.

Even those that do not leak at first when properly installed, are quite sensitive to blows or to the strains imposed by the expansion and contraction due to the temperature range of the boiler, its pipes and its connections.

And, as a result of this sensitiveness, such couplings almost without exception, develop a slow leak a short time after their installation.

A further object of my invention is to provide a coupling that is not sensitive to shocks and strains, and that will not develop leakage from ordinary shocks and strains.

Other couplings, that do not leak at first when properly installed, develop a leak in time due to deterioration in the particular packing material which it is necessary to use because of their design or construction.

A further object of my invention is to provide a coupling whose design is such that in its construction only materials that will not deteriorate are required.

When an accessory coupling is to be installed in a boiler or tank, the water is first shut off and the boiler or tank is then drained.

A circular hole is then made in the boiler in the position desired for the coupling.

The hole may, of course, be made by any proper means, but however it is made, it should be of the proper size and properly positioned, as anyone versed in such matters will appreciate.

The construction of my coupling is shown in the drawings, in which:—

Figure 10:
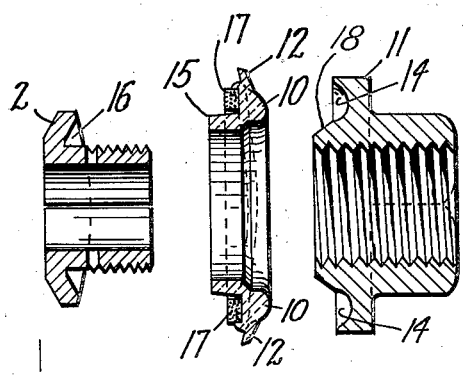
Figure 12:
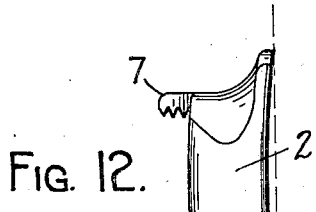
Figure 11:
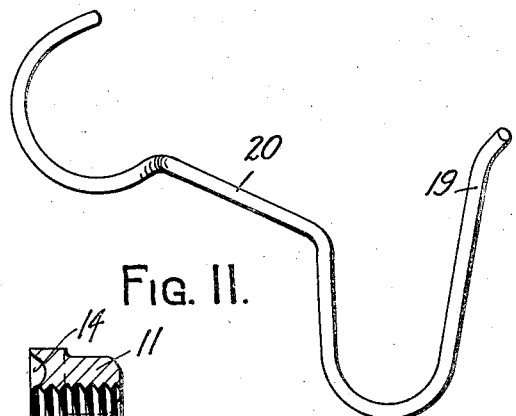
Figure 13:
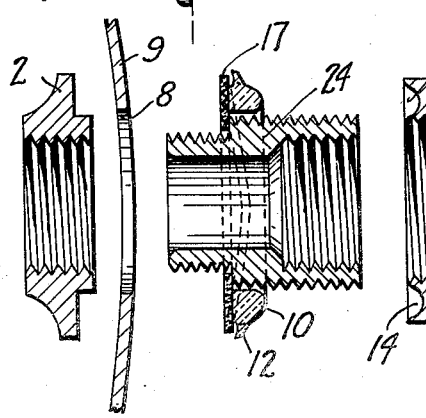

Figure 1 is the internal flange;
Figure 2 is the seal member;
Figure 3 is the body part, or external flange;
Figure 4 is another view of the internal flange;
Figure 5 is another view of the seal member showing also the packing washer;
Figure 6 is another view of the body part or external flange;
Figure 7 is a view of the wire spanner;
Figure 8 is an assembly view in partial section, showing the spanner, spanner brace, and the coupling in place;
Figure 9 is a central section of the internal flange, seal member, packing washer and body part or external flange;
Figure 10 is a central section of a modified form of the internal flange, seal member, packing washer and body part or external flange;
Figure 11 shows the spanner brace;
Figure 12 shows a side elevation of the internal flange;
Figure 13 is a central section of another modified form showing the internal flange, boiler wall, seal member, packing washer and body part or external flange.

In the installation of my coupling the spanner 1 when in the position shown in Figure 7, is inserted through the threaded aperture of the internal flange 2, and the spanner hook 3 is then hooked around the spanner handle 4, which forces the spanner to assume the position shown in Figure 8, the ends 5 of the spanner 1, contacting against the faces 6 of the internal flange lugs 7, and the parts of the spanner being under considerable tension. The spring of the material of the spanner 1 acts to hold the internal flange 2 firmly, so that it may be inserted through the hole 8 in the boiler wall 9 and then held against the inner surface of the boiler wall.

The seal member 10 is provided with a groove in which fits the packing washer 17. While I prefer the groove in the seal member, as it tends to support the packing washer, it may, if desired be dispensed with, if the proper material is used for the packing washer 17.

The external flange or body part 11, is provided with an internally threaded hex head and externally threaded extension, 22. The seal member 10 and the external flange 11 are passed over the spanner 1, while the internal flange is still held against the inner face of the boiler wall.

With an upright, cylindrical boiler, the indicator points 12, on the seal member 10, should point right and left, or at right angles to the extent of the boiler. It will be noted that the inner face of the seal member 10, which is toward the boiler is not flat, but is formed to fit the curve of the boiler, while the plane of the opposite or outer face of the seal member is square with its central axis, and is formed to fit the concave or cupper seat 14 of the external flange 11.

By this construction of the seal member 10, the curve of the outer face of the boiler is compensated for; a packing washer with parallel faces may be employed; and an even pressure against the entire outer face of the boiler and against the entire inner face of the seal member 10 is insured, which would not be the case if the seal member 10 had parallel faces.

As a matter of fact, the packing washer used is slightly compressible and this permits the coupling to make a tight joint even if the inner face of the seal and the bottom of its groove do not exactly follow the curve of the boiler, and even if the outer face of the boiler is slightly rough and irregular.

There are several slightly different diameters of boilers in common use, and the above stated latitude given by my coupling allows the manufacture of but one coupling which will accommodate for the slight difference of curve of the boilers of different diameters, within the limits commonly found.

The seal member 10 is provided with an offset or extension 15, which fits in the hole 8 of the boiler wall, and thereby centers the seal member 10.

Th internal flange 2 is provided with a counterbore 16, to prevent contact between it and the offset or extension 15.

The internal flange 2 may be made flat faced as shown in Figure 9, or curved to fit the inner surface of the boiler as shown in Figure 10, or with a slight reverse vertical curve as shown in Figure 12, so as to contact with the inner surface of the boiler wall at the upper and lower extremities only.

I prefer this latter form, as it seems to have less tendency to revolve inside the boiler when the external flange is screwed into place. But, either of the other forms, or any other proper form may be used if desired.

The packing washer 17 is made of slightly flexible and compressible fiber or of any other proper material desired, and is of the same thickness throughout; that is, its faces are parallel to each other.

The packing washer 17 fits in a groove in the inner face of the seal member 10, the depth of the groove being equal to about half the thickness of the washer, and the bottom of the groove not being flat, but being formed to follow the curve of the outer face of the boiler.

So, the packing washer 17, when seated in the bottom of the groove, will conform approximately to the curve of the boiler and will be able to make a water tight connection therewith. Hence, the washer 17 may be made of non-deteriorating material which need be only slightly compressible.

The gooseneck 19 of the spanner brace 20 is inserted through the loop 21 of the spanner 1, and the brace 20 is then sprung down into place against the boiler as shown in Figure 8.

This holds the spanner 1 and the internal flange 2 firmly in place, leaving the hands free for further operations, as will appear below.

Before being placed upon the spanner 1, the seat 14 of the external flange 11 should preferably be oiled or greased to insure movement between the seat 14 and the seal member 10 so that the desired compressing and spinning action will take place and a perfectly water tight connection will result, as will appear below.

The external flange 11, is provided with the expansion taper 18. As the flange 11 is screwed into the internal flange 2, the expansion taper 18 contacts with the internal face of the offset or extension 15 of the seal member 10.

As the external flange 11 is screwed further into the internal flange 2, the expansion taper 18 acts to expand the offset 15 in the hole 8 of the boiler wall 9 and to form a tight connection between the seal member 10 and the boiler wall.

The action of the expansion taper 18 also forms a slight riveting effect upon the offset 15 inside the boiler and in the space provided by the counterbore 16 of the internal flange 2.

As the external flange 11 is screwed still further into the internal flange 2, the concave or cupped seat 14 of the external flange 11 contacts with the outer face of the seal member 10.

Further movement of the external flange 11 tends to press and spin the seal member 10 till the two parts come to a perfect seat, as the expanding and riveting of the seal member offset 15 in the hole 8 of the boiler wall 9, by the expansion taper 18 and the curved fit of the seal member and the packing ring against the boiler both combine to prevent the seal member from turning.

The lubricated movement of the seat 14 of the external flange 11, thus presses and spins the stationary softer seal member to a perfect leak proof seat.

When pressure is thus applied by the external flange 11 to the seal member, it forces the packing washer 17 evenly into close contact with the outer face of the boiler wall, forming a leak proof joint at this point, so that the entire coupling connection with the boiler is leak proof.

The metal to metal spun seat between the external flange 11 and the softer seal member 10 will of course not deteriorate.

And the design of the seal member permits the use of material in the packing washer which will not deteriorate.

The expansion and riveting of the offset of the seal member in the hole of the boiler wall and the firm nature of the material which may be used as a packing washer in my invention, combine to make a coupling that is not sensitive to ordinary shocks nor to strains due to the temperature range of the boiler, its pipes and its connections.

Thus, all the objects sought by my invention are attained.

In the modified form shown in Figure 10, the internal flange 2 is in two parts, and is provided with a threaded body which protrudes through the hole in the boiler wall, and upon which the external flange 11 screws.

When the external flange screws upon the threaded body of the internal flange 2, however, the action of the expansion taper and of the seal member, packing washer, and the spinning seat of the external flange are all practically the same as is the case with the preferred form mentioned above.

In the modified form shown in Figure 13, the seal member has no extension or groove, but its inner face is formed to approximate the contour of the outer face of the boiler.

The internal flange has an offset or extension, which fits in the aperture of the boiler and there is also provided a shouldered and threaded sleeve 24 which screws into the internal flange and thus becomes part of the stationary member of the coupling. The shoulder of the sleeve 24 clamps the packing washer 17 against the internal flange.

When the external flange 11 screws upon the sleeve 24, however, its progress on the threads of the sleeve clamps the seal member 10 and the packing washer 17 against the boiler and also spins a seat upon the seal 10 in the same manner as in the other constructions.

Though my coupling is designed primarily for use with hot water boilers and tanks, it may be just as well employed as an accessory to make a permanent coupling for any other fluid container, whether its walls are thick or thin, and whether its walls are curved or flat.

All that is needed to adapt my coupling to such different conditions is the proper change of design to fit the new situation without departing in the least from the essence of my construction.

I am aware that the stationary member of the coupling, (that is, the combined boiler wall and internal flange), may be made as one piece and the coupling may then be used as a pipe coupling, the spun seat and the compressible packing washer performing in this case, the same functions as before, with the extension of the seal expanded in the stationary member if desired; or the seal may be provided without the extension.

When used as a pipe coupling, the seal member may be pressed, soldered, brazed, sweat, welded, or in any other proper manner made to form a leak proof joint with the stationary member and the progress of the adjusting member, or external flange, will still spin a seat upon the seal member, and the coupling will be leak proof.

I am well aware that there are various other modifications and alterations which might be made in my coupling and in the method and manner of installing same, which would not depart from the spirit of my invention.

For instance, the spinning seat of the external flange could be faced with spinnable material, the seal then being made of non-spinnable material; or different designs of spanners and spanner braces might be used; other designs and forms of internal flange than those shown might be employed; parts shown in one form might be used with parts shown in another form.

But these are changes which anyone versed in such couplings would at once appreciate, so I do not wish to confine myself narrowly to the exact structures shown and described, but

What I claim as new and desire to protect by Letters Patent, is as follows:—

1. In an accessory pipe connection, stationary means having a cylindrical apertured exterior surface, a one piece threaded apertured member completely insertable through the aperture to the interior of said stationary means and adapted to be placed completely within and to bear against the interior surface thereof, an adjusting member having a threaded inwardly projecting portion for engagement with the apertured member and provided with a circular grooved spinning face, and sealing means, including a metallic seal member adapted to fit said spinning face and between said face and said stationary means and formed substantially to the contour of said stationary means on the face adjacent thereto, the adjustment of said engagement being adapted to force the sealing means against the stationary means and to spin a seat upon said seal member in the groove of said spinning face.

2. In an accessory pipe connection apertured stationary means having cylindrical exterior and interior surfaces, a one piece threaded apertured member within said stationary means and in contact with its interior surface, an adjusting member having threaded engagement with the apertured member and provided with a concentric spinning seat having converging inner and outer faces, and sealing means including a metallic seal member adapted to fit said seat and positioned between said seat and said stationary means and formed on its adjacent face substantially to the contour of said cylindrical exterior surface, the adjustment of said engagement being adapted to force the sealing means against the stationary means and spin a seat upon the seal member by the converging pressure exerted by the opposed faces of said seat.

3. In an accessory pipe connection adapted to be mounted upon a hollow, apertured cylindrical body having a circular aperture, sealing means on the exterior of said body, and including a metallic seal member having a spinnable outer face and an inner face substantially formed to the contour of said body, a threaded apertured inner member within and bearing against the inner surface of said body, and a threaded apertured adjustment member provided with a spinning face and inwardly projecting threaded portion adapted to screw into said inner member and thereby force said sealing means against said body and spin a tight joint upon the outer face of said seal member.

4. In an accessory pipe connection adapted to be mounted upon a hollow, apertured cylindrical body having a circular aperture, sealing means on the exterior of said body, and including a metallic seal member having a spinnable outer face and an inner face substantially formed to the contour of said body, a threaded apertured inner member having two substantially parallel sides bearing against the inner surface of said body with said parallel sides substantially parallel to the axis of said member, and a threaded apertured adjustment member provided with a spinning seat having inner and outer converging faces and adapted to screw into said inner member and thereby force said sealing means against and said body and spin a tight joint between said seal member and said seat by the converging pressure exerted by the opposed faces of said seat.

5. In an accessory pipe connection, an apertured cylindrical wall, a threaded apertured inner member adapted to be placed against the concave face of the wall concentric with the aperture therethrough, sealing means adapted to contact with the opposite face of the wall and including an apertured seal member having an extension adapted to fit in the aperture of the wall, and an apertured, threaded adjusting member in threaded engagement with the inner member and having a flange with a groove having inner and outer converging faces adapted to act as a spinning seat against said seal member and having an externally tapered extension, the adjustment of said engagement adapted to force said sealing means against said wall and spin a seat upon the seal member by forcing material of the seal member into the groove of said spinning seat and to expand the seal member extension in the aperture of the wall by pressure from said tapered extension of the adjusting member.

6. In an accessory pipe connection, an apertured cylindrical wall, a threaded apertured inner member adapted to be placed against the concave face of the wall concentric with the aperture, sealing means adapted to contact with the opposite face of the wall and including a metallic seal member of unequal thickness with one face grooved and formed to the approximate contour of said wall face and including a non-metallic gasket in said groove and between said seal member and said wall face, and an apertured threaded adjustment member in threaded engagement with the inner member and having a flange with a curved face adapted to act as a spinning seat against said seal member, the adjustment of said engagement being adapted to force said sealing means against said wall and thereby hold it stationary due to its unequal thickness and its fit against the contour of said wall, and to spin a seat upon the seal member by pressure exerted to force the material of the seal member into said curved face.

7. In an accessory pipe connection, an apertured cylindrical wall, a threaded apertured inner member adapted to be placed against one face of the wall concentric with the aperture, sealing means adapted to contact with the opposite face of the wall and including a metallic seal member of unequal thickness with one spinnable face and the other face formed to the approximate contour of said wall face to equalize the pressure therebetween, and having an extension adapted to fit in the aperture of the wall, and a non-metallic gasket between the seal member and the wall, and an apertured threaded adjustment member in threaded engagement with the inner member and having a flange with a face adapted to act as a spinning seat to spin one face of said seal member, and a tapered extension adapted to contact with the extension of said seal member while the spinning seat is still spaced from said seal member, the adjustment of said engagement being adapted to force the sealing means against the wall, spin a tight joint between the said seat and said seal member, and expand said seal member extension in said aperture by contact with said tapered extension prior to the spinning of said tight joint.

In testimony whereof I affix my signature.

PETER J. LINDGREN.